United States Patent [19]

LeGrand

[11] 3,997,898
[45] Dec. 14, 1976

[54] CHANNELING METHOD AND APPARATUS

[75] Inventor: Jesse S. LeGrand, Clifton, N.J.

[73] Assignee: International Telephone and Telegraph Corporation, Nutley, N.J.

[22] Filed: May 5, 1975

[21] Appl. No.: 574,223

[52] U.S. Cl. .................. 343/6.5 R; 343/17.2 R
[51] Int. Cl.² ........................................ G01S 9/56
[58] Field of Search ....... 343/6.5 LC, 6.5 R, 17.2 R

[56] References Cited
UNITED STATES PATENTS 3,076,190  1/1963  Shames et al. ............. 343/6.5 LC
3,825,929  7/1974  Toman ......................... 343/6.5 R Primary Examiner—T.H. Tubbesing
Attorney, Agent, or Firm—John T. O'Halloran; Peter C. Van Der Sluys; Vincent Ingrassia

[57] ABSTRACT

This relates to a channeling scheme for introducing a new service in the TACAN frequency band which can operate independently of the conventional TACAN system or in conjunction with it. Specifically, the new service is that of providing precision DME for a microwave landing system and for allowing existing TACAN airborne sets, when equipped with an adapter, to utilize new MLS ground beacons. In one channeling scheme, interrogations occur in frequency bands adjacent the standard TACAN interrogation band, and ground transmissions occur in frequency bands presently occupied by X mode reply signals. In a second scheme, which contemplates the use of standard airborne equipment provided with an adapter, interrogations occur within the conventional TACAN interrogation band, and replies occur in the bands now occupied by X mode reply signals.

8 Claims, 6 Drawing Figures

CHANNELING METHOD AND APPARATUS

CROSS-REFERENCE TO RELATED APPLICATION

This is related to co-pending application, Ser. No. 565,311, filed Apr. 4, 1975 and entitled "Channeling Coding for Distance Measurement Equipment" assigned to the assignee of the present invention.

BACKGROUND OF THE INVENTION

This invention relates generally to a channeling method and apparatus for introducing additional service in the TACAN frequency band and more particularly for introducing precision DME for a microwave landing system (MLS), wherein said channeling scheme may be operated independently of the present TACAN system or in conjunction with it.

The present TACAN/VORTAC/DME system (hereinafter referred to as TACAN) utilizes an airborne transmitter operating in the frequency range of 1025–1150 MHz. The conventional airborne transmitter transmits a pair of Gaussian shaped interrogation pulses, the pulses of each pair spaced 12 microseconds apart for X mode operation and 36 microseconds apart for Y mode operation. Conventional transponders monitor the environment and upon receipt of on channel interrogation pulses generate trigger pulses which, in turn, initiate reply pulses. If X mode interrogations are received, the reply signal consists of a pair of Gaussian pulses spaced 12 microseconds apart. These reply pulses are transmitted in either the 962–1024 MHz or 1151–1213 MHz frequency range. If Y mode interrogations are received, the reply signal consists of a pair of Gaussian pulses spaced 30 microseconds apart. Y mode reply signals are transmitted in the 1025–1150 MHz frequency range. In every case, the difference between the transmit frequency and receive frequency is ± 63 MHz. This is true for the airborne equipment and the ground equipment, and represents a very convenient arrangement since the same RF source used to drive the transmitter can also be used as the receiver local oscillator provided that the receiver's first IF stage is 63 MHz.

The conventional channeling arrangement described above also permits ranging between airborne sets, each of which transmit Gaussian pulse pairs and receive single Gaussian pulse replies. This is commonly referred to as the Air/Air mode. All transmission and reception in this mode occurs in the 1025–1150 MHz frequency range, and the difference in transmit and receive frequencies is also 63 MHz. Complete details can be found in MIL-STD 291.

In conventional L-Band DME systems, standardized by the International Civil Aviation Organization (ICAO), interrogations and replies comprise pairs of Gaussian pulses each having a duration of 3.5 microseconds and having rise times in the order of 2.5 microseconds. The resulting accuracy, limited by this rise time, is less than what may be desirable for applications associated with the microwave landing system (MLS) which has been suggested by a special committee of the Radio Technology Commission for Aeronautics. Care must be taken, however, that any new high accuracy DME system operating an L-Band will not interfere with the currently operating and conventional NAV-/ILS L-Band system and further, will not be interferred with by the currently operating system.

SUMMARY OF THE INVENTION

It is an object of the present invention to provide a channeling method for introducing a precision DME service in the TACAN band, which service can operate independently of the current TACAN system or in conjunction with it. According to a broad aspect of the invention, there is provided a method of determining distance between an interrogator and a transponder comprising: transmitting from an interrogator X and Y mode interrogation signals within the TACAN frequency band; receiving said interrogation signals at a transponder; transmitting from said transponder and in response to said interrogation signals X and Y mode phase coded reply signals in the first and fourth quarter of the TACAN frequency band; receiving said reply signals at said interrogator; and processing said reply signals to determine distance between said interrogator and said transponder.

The above and other objects of the present invention will be more clearly understood from the following detailed description taken in conjunction with the accompanying drawings in which:

DESCRIPTION OF THE PREFERRED EMBODIMENT

Figure 1:
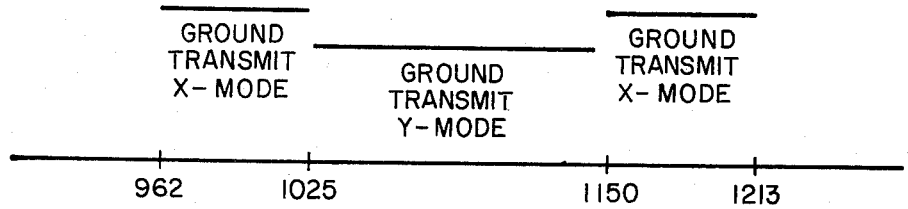
FIG. 1 illustrates graphically the conventional TACAN channel arrangement.

FIG. 1 illustrates graphically the conventional TACAN channeling arrangement. X mode interrogations in the 1025–1087 MHz frequency range are responded to with reply signals in the 962–1024 MHz frequency range. X mode interrogation signals in the 1088–1150 MHz frequency range are responded to with reply signals in the 1151–1213 MHz frequency range. In each case, the frequency difference is 63 MHz.

Y mode interrogation signals in the 1025–1087 MHz frequency range are responded to with reply signals in the 1088–1150 MHz frequency range while interrogations in the 1088–1150 MHz frequency range are replied to with signals in the 1025–1087 MHz frequency range. Again, the frequency difference is ± 63 MHz.

Figure 2:
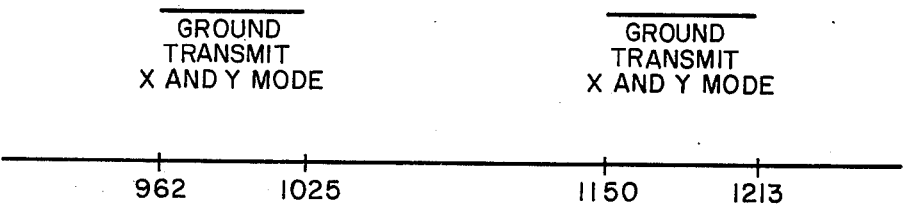
FIG. 2 illustrates graphically a first channeling scheme according to the present invention.

FIG. 2 and Table I illustrate a proposed channeling scheme for the proposed MLS system.

TABLE I

| Channel | Air Transmit (MHz) | Ground Transmit (MHz) | Intermediate Frequency (MHz) |
| --- | --- | --- | --- |
| 1X | 962 | 1151 | 189 |
| 1Y | 962 | 1151 | 189 |
| ⋮ | ⋮ | ⋮ | ⋮ |
| 63X | 1024 | 1213 | 189 |
| 63Y | 1024 | 1213 | 189 |
| 64X | 1151 | 962 | 189 |
| 64Y | 1151 | 962 | 189 |
| ⋮ | ⋮ | ⋮ | ⋮ |
| 126X | 1213 | 1024 | 189 |
| 126Y | 1213 | 1024 | 189 |

Both X and Y mode interrogations in the 962–1024 MHz frequency range will elicit reply signals in the 1151–1213 MHz frequency range. X and Y mode interrogations in the 1151–1213 MHz frequency range will be responded to with reply signals in the 962–1024 MHz frequency range. Employing this proposed channel scheme, the frequency difference between received and transmitted signals is 189 MHz.

As can be seen in Table I and FIG. 2, the airborne transmit frequencies are 962–1024 MHz for channels 1 through 63, and 1151–1213 MHz for channels 64 through 126, thus yielding a total of 126 radio frequencies. If two codes (X and Y) per frequency are utilized, a total of 252 channels become available.

Of course, the pulses radiated must differ considerably from conventional TACAN pulses so that the ground receivers will readily distinguish them from pulses being transmitted from X mode TACAN ground beacons operating in the same frequency band. A preferred transmitted signal is a single phase coded pulse having a duration of 3.33 to 5 microseconds.

Figure 4:
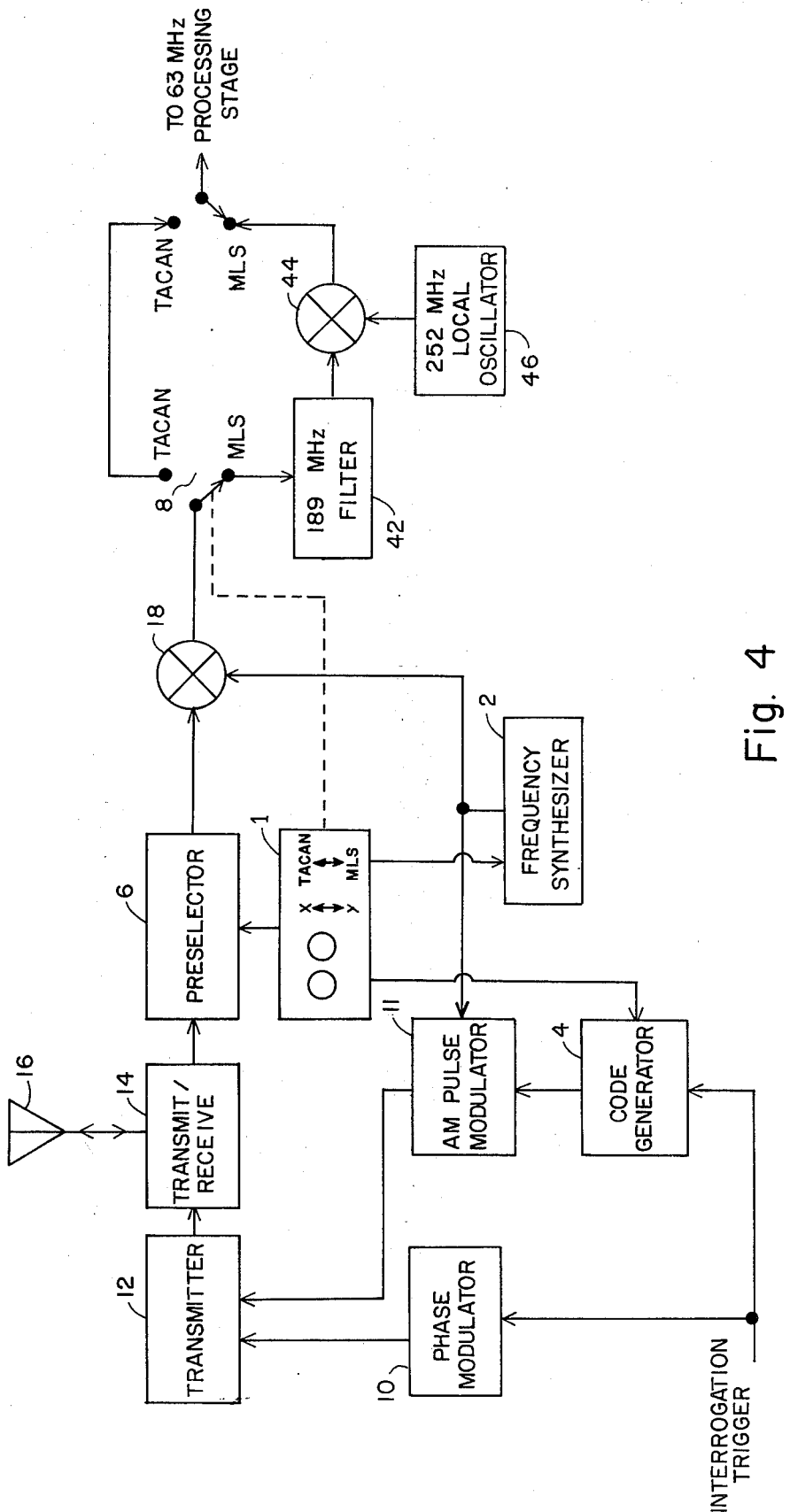
FIG. 4 is a block diagram of an interrogator for use in conjunction with the channeling scheme shown in FIG. 2.

The essential elements of an interrogator for use in conjunction with the channeling scheme shown in FIG. 2 is shown in FIG. 4. This interrogator can also be used as a TACAN interrogator.

Let us assume that MLS operation on channel IX is desired. A control box 1 would set frequency synthesizer 2 to 962 MHz, preselector 6 to 1151 MHz, TACAN/MLS switch 8 to the MLS position, and commands code generator 4 to generate an X code. An interrogation trigger from the ranging circuitry, which is applied to code generator 4, initiates the generation of a code which is subsequently applied to AM pulse modulator 11, the output of which phase modulates the output of frequency synthesizer 2. The code is also applied to transmitter 12 via modulator 11. Further, the interrogation trigger is applied to transmitter 12 after modulation in phase modulator 10. A phase coded pulse is then radiated by antenna 16 via transmit receive switch 14.

Figure 5:
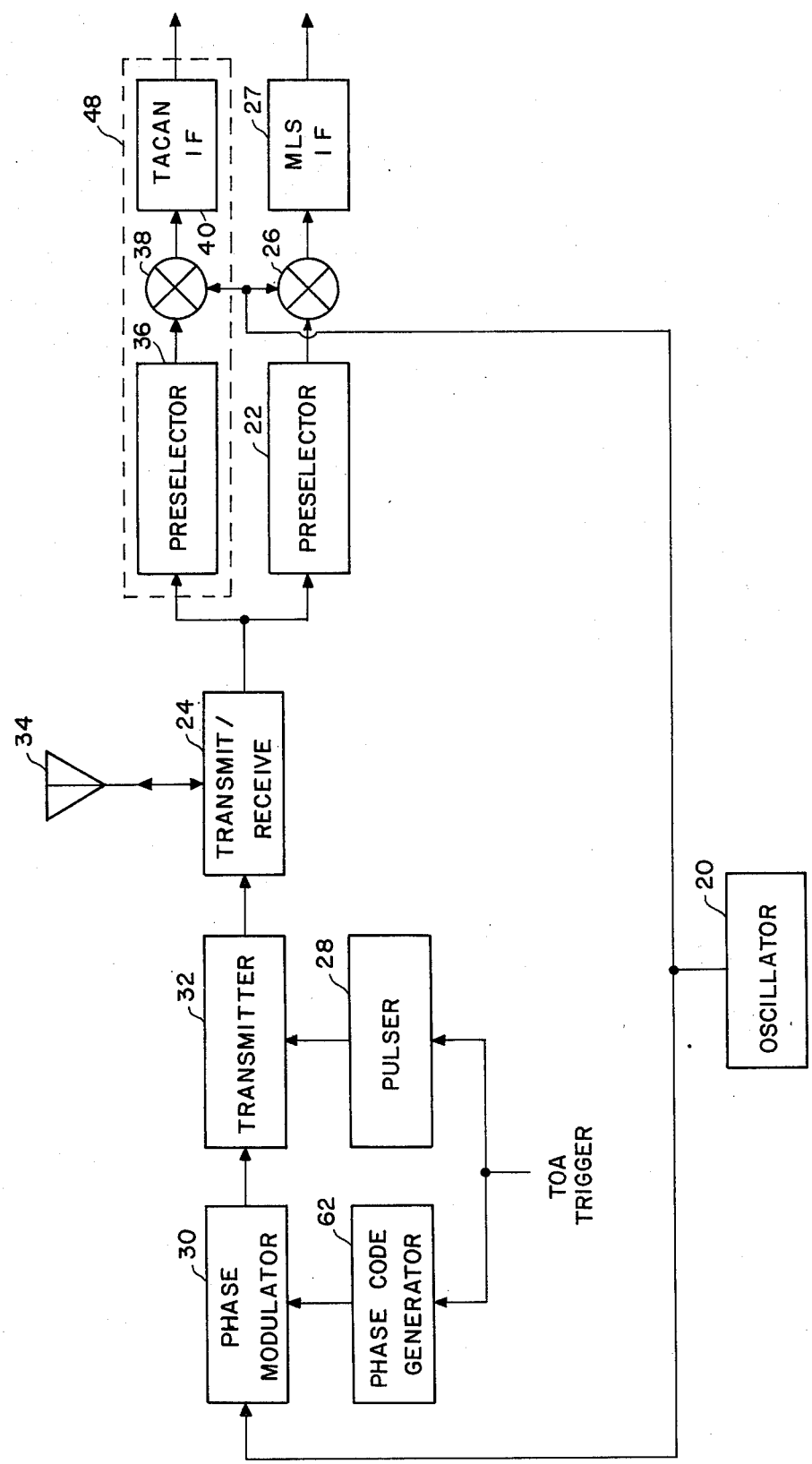
FIG. 5 is a block diagram of a ground beacon receiver capable of replying to either phase coded interrogations or conventional interrogations.

The phase coded pulse radiated will be received by a ground beacon receiver of the type shown in FIG. 5. The ground beacon receiver contains a local oscillator 20 whose frequency is set to 1151 MHz and an MLS preselector 22 tuned to 962 MHz (see Table I).

The receive signal passes through transmit/receive switch 24, preselector 22, and is applied to MLS mixer 26 where it is beat with the output of oscillator 20 resulting in a difference frequency output of 189 MHz as shown in Table I. The output of mixer 26 is then amplified, processed and detected in MLS i.f. stage 27 to generate a time of arrival (TOA) pulse. The TOA pulse is then used to generate transmit triggers which initiate a fast rise time phase coded reply pulse via pulser 28, code generator 62, phase modulator 30 and transmitter 32. This is more fully described in co-pending application, Ser. No. 565,311 entitled "Channeling Coding for Distance Measurement Equipment" assigned to the assignee of the present invention, and to the extent necessary for a complete understanding of the invention is hereby incorporated by reference.

Of course, referring to FIG. 5, if TACAN operation were required, TACAN interrogations would be received via antenna 34 and transmit/receive switch 24 and would proceed through the TACAN interrogation receive path consisting of preselector 36, mixer 38 and IF stage 40. As will be more fully described hereinbelow, this path is utilized when a conventional interrogator is equipped with an adapter of the type shown in FIG. 6.

Referring again to FIG. 4, the phase coded reply pulse is received in the airborne equipment via antenna 16, transmit/receive switch 14 and preselector 6. The outputs of preselector 6 and frequency synthesizer 2 which had previously been set to 1151 MHz and 962 MHz respectively are beat in mixer 18. When switch 8 is in the MLS position as shown, the beat frequency is passed through filter 42 and mixed in mixer 44 with the output of a 252 MHz local oscillator 46 to produce the standard 63 MHz IF signal which is applied to the IF processing stages of the interrogator.

It should be noted that the introduction of these signals in the frequency bands shown in FIG. 2 will not cause any interference to ground based TACAN receivers since the receivers are not monitoring any of the frequencies occupied by the new signals.

Figure 6:
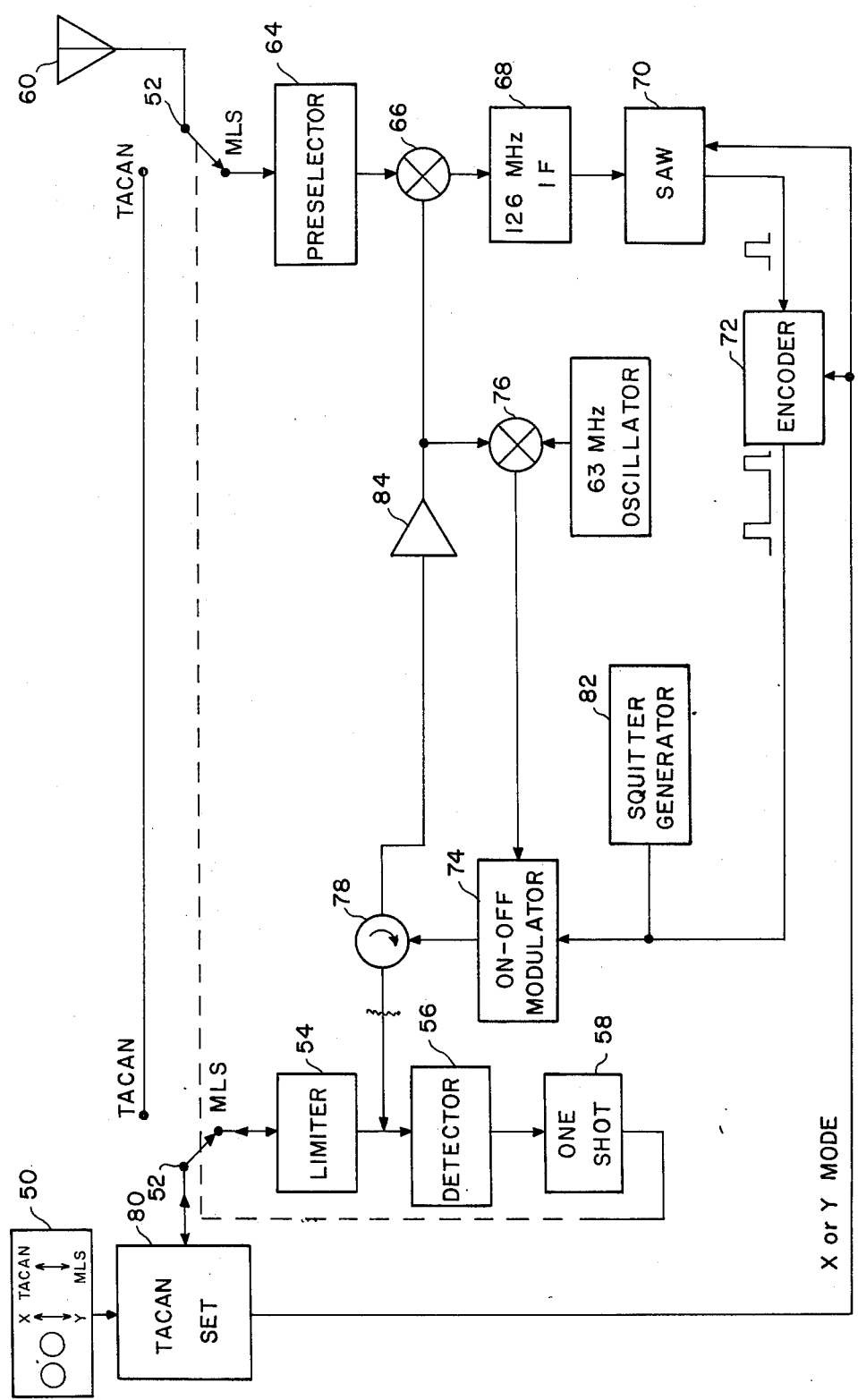
FIG. 6 is a block diagram of standard airborne TACAN equipment provided with an adapter for receiving high precision phase coded reply signals.

The beacon shown in FIG. 5 can be utilized with existing TACAN sets by the incorporation of an adapter arrangement, shown in FIG. 6, to the existing airborne TACAN sets. The incorporation in the beacon of TACAN receive unit 48 in the ground beacon (FIG. 5) as described above, permits conventional TACAN sets to obtain ranging information from new MLS DME beacons.

Figure 3:
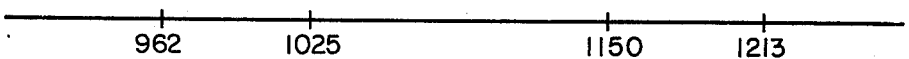
FIG. 3 illustrates graphically a second channeling scheme according to the present invention.

FIG. 3 and Table II illustrates the frequency channel allocation required for such an adaptive arrangement.

TABLE II

| Channel | Air Transmit (MHz) | Ground Transmit (MHz) | Intermediate Frequency (MHz) |
| --- | --- | --- | --- |
| 1X | 1025 | 1151 | 126 |
| 1Y | 1025 | 1151 | 126 |
| | | | |
| 63X | 1087 | 1213 | 126 |
| 63Y | 1087 | 1213 | 126 |
| 64X | 1088 | 962 | 126 |
| 64Y | 1088 | 962 | 126 |
| | | | |
| 126X | 1150 | 1024 | 126 |
| 126Y | 1150 | 1024 | 126 |

The interrogation signals in both the X and Y mode will occur in the frequency range of 1025 to 1150 MHz. Now, however, as in FIG. 2, interrogations in the frequency range of 1024–1087 frequency range will be responded to with reply signals in the frequency range of 1151 to 1213 MHz. Interrogation signals in the 1088 to 1150 MHz will be responded to with reply signals in the frequency range of 962 to 1024 MHz. Referring to FIG. 6, which is a block diagram of a conventional TACAN airborne equipment equipped with an adapter, we will assume operation on MLS channel IX. Control box 50 would be set to MLS channel IX, therefore resulting in a transmit frequency of 1025 MHz and a receive frequency of 962 MHz in accordance with standard TACAN channeling.

Assuming switch 52 is initially set in the MLS position, a conventional interrogation by the TACAN set would pass through a protective limiter 54 and envelope detector 56, whose output triggers one-shot 58 to the ON condition. This immediately causes switch 52 to be placed in the TACAN position, thereby allowing all but the very first portion of the first pulse of the standard TACAN pulse pair interrogation to pass directly to radiator 60 and to be radiated thereby. One-shot 58 has a duration of approximately 39 microseconds in order that either X or Y mode interrogations can be transmitted. When one-shot 58 returns to the OFF condition after 39 microseconds, switch 52 will return to the MLS position.

As stated above, the 1025 MHz interrogations are received by the ground beacon shown in FIG. 5. The incoming signal is received by antenna 34 and passes through transmit/receive switch 24 and preselector 36 which is tuned to 1025 MHz to TACAN mixer 38. Referring to Table II, the local oscillator frequency is 1151 MHz. Thus, an IF of 126 MHz is obtained.

The hardware following mixer 38 is functionally that of a conventional TACAN ground receiver. It contains pulse pair decoders, adjacent channel rejection circuitry, dead-time circuitry, etc. The output of this circuitry is a time of arrival pulse which, after appropriate processing, initiates a phase coded reply having a frequency of 1151 MHz. This is accomplished via code generator 62, pulser 28, phase modulator 30 and transmitter 32. As stated previously, further details of this processing can be found in the above cited co-pending application and further discussion at this point is not deemed necessary. It is to be noted that the reply signal is identical to the reply obtained as a result of an interrogation through the MLS path as discussed above.

Precedence to MLS interrogations may easily be provided by the inclusion of priority circuitry.

The phase coded replies from the ground beacon are received in the airborne equipment (FIG. 6) by antenna 60 and applied, via preselector 64, to mixer 66, which mixer is excited with the local oscillator frequency of 1025 MHz (the transmit and local oscillator frequency of the TACAN set). The output of mixer 66 is a 126 MHz signal which drives a 126 MHz IF stage 68 which in turn drives a phase coded pulse correlator, for example a surface acoustic wave device (SAW) 70.

The output of SAW 70 is applied to an encoder 72 which generates a pair of video pulses spaced, in this case, 12 microseconds apart. Of course, SAW 70 and encoder 72 is influenced by X and Y mode selection in the TACAN set. The output of encoder 72 drives on/-off modulator 74 which has applied thereto the output of mixer 76 whose major output frequencies are 1025 ± 63 MHz. The output of mixer 76, having a frequency of 962 MHz, corresponds to the receiving frequency to which the TACAN set is tuned. Thus, a 962 MHz pulse pair is generated at the output of on/off modulator 74 which passes through circulator 78, limiter 54 and switch 52 to the TACAN set 80 where it is processed as a normal TACAN reply.

A squitter generator 82 is included in the adapter to provide pulse pairs sufficient for the TACAN set automatic gain control circuitry.

The adapter circuitry shown requires sufficient local oscillator leakage from the antenna terminals of the TACAN set. If it exists, it is amplified in amplifier 84 and is used as the local oscillator input to mixers 66 and 76. If sufficient leakage does not exist, the local oscillator signals for mixers 66 and 76 can be extracted directly from the TACAN set via a coaxial cable, or created by a separate frequency generator.

Therefore, using two pulse codes for each interrogation frequency and two different pulse codes for each reply frequency, there is provided a total of 252 MLS channels which may be utilized by new MLS airborne sets which may also have a TACAN capability, or by existing TACAN sets using the adapter of FIG. 6.

While the principles of the invention have been described above in connection with specific apparatus, it is to be clearly understood that this description is made only by way of example and not as a limitation on the scope of the invention.

What is claimed is:

1. A method of responding to X mode and Y mode interrogation signals wherein said interrogation signals have frequencies within the first and fourth quarter of the TACAN frequency band, comprising the step of transmitting X and Y mode phase coded reply signals in the first and fourth quarter of the TACAN frequency band.

2. A method of interrogating a transponder wherein said transponder is of the type which replies to X and Y mode interrogations within the standard TACAN frequency band comprising the step of transmitting X and Y mode phase coded interrogation signals within the first and fourth quarter of the TACAN frequency band.

3. A method of determining distance between an interrogator and a transponder comprising:
  transmitting from an interrogator X and Y mode interrogation signals within the TACAN frequency band;
  receiving said interrogation signals at a transponder;

transmitting from said transponder and in response to said interrogation signals X and Y mode phase coded reply signals in the first and fourth quarter of the TACAN frequency band;

receiving said reply signals at said interrogator; and processing said reply signals to determine distance between said interrogator and said transponder.

4. A method according to claim 3 wherein said transmitting from an interrogator includes transmitting phase coded interrogation signals within the first and fourth quarter of the TACAN frequency band.

5. A method according to claim 4 wherein interrogation signals in said first quarter are responded to with reply signals in said fourth quarter and wherein interrogation signals in said fourth quarter are responded to with reply signals in said first quarter.

6. A method according to claim 3 wherein said transmitting from an interrogator includes transmitting conventional TACAN interrogations within the second and third quarter of the TACAN frequency band.

7. A method according to claim 5 wherein interrogation signals in said second quarter are responded to with reply signals in said fourth quarter and wherein said interrogation signals in said second quarter are responded to with reply signals in said first quarter.

8. An apparatus for use with airborne equipment of the type which transmits Gaussian pulse pair interrogation signals in the TACAN frequency band to a transponder, and wherein normally said transponder generates pulse pair reply signals in response to said interrogations which are received and processed by said airborne equipment, and wherein said pulse pair reply signals are replaced by phase coded interrogation signals having a frequency different from the normal pulse pair replies, said airborne equipment including a transmitter, a receiver, an interrogator and an antenna, said apparatus comprising:

means for receiving said phase coded reply signal;

means for converting said phase coded reply signal to a pulse pair signal; and means for altering the frequency of said reply signal to correspond to the frequency of a standard pulse pair reply signal such that said altered reply signal may be processed by said airborne equipment.

* * * * *